United States Patent [19]

Stohr et al.

[11] Patent Number: 5,685,932
[45] Date of Patent: Nov. 11, 1997

[54] PROCESS FOR THE PRODUCTION OF A MICROPOROUS BODY HAVING HEAT INSULATION PROPERTIES

[75] Inventors: Günter Stohr, Durach; Thomas Eyhorn, Altusried; Günter Kratel, Durach, all of Germany

[73] Assignee: Wacker-Chemie GmbH, Munich, Germany

[21] Appl. No.: 522,831

[22] Filed: Sep. 1, 1995

Related U.S. Application Data

[63] Continuation of Ser. No. 235,548, Apr. 29, 1994, abandoned.

[30] Foreign Application Priority Data

May 6, 1993 [DE] Germany ............... 43 15 088.8

[51] Int. Cl.$^6$ ............... B32B 31/12; C04B 38/06; E04B 1/74
[52] U.S. Cl. ............... 156/89; 156/242; 264/43; 264/44; 264/59; 264/67; 252/62
[58] Field of Search ............... 252/62; 264/42, 264/43, 44, 56, 59, 67, 332; 156/62.2, 77, 89, 153, 242

[56] References Cited

U.S. PATENT DOCUMENTS

| | | |
|---|---|---|
| 3,055,831 | 9/1962 | Barnett et al. ............... 252/62 |
| 4,012,262 | 3/1977 | Patterson et al. ............... 252/62 X |
| 4,190,547 | 2/1980 | Mahnke et al. ............... 252/62 |
| 4,212,925 | 7/1980 | Kratel et al. ............... 252/62 X |
| 4,240,496 | 12/1980 | El Gammal ............... 252/62 X |
| 4,363,738 | 12/1982 | Kummermehr . | |
| 4,446,040 | 5/1984 | Samanta ............... 252/62 |
| 4,544,409 | 10/1985 | Daussan et al. ............... 252/62 X |
| 4,681,788 | 7/1987 | Barito et al. ............... 252/62 X |
| 4,925,584 | 5/1990 | McWilliams et al. ............... 252/62 |
| 4,985,163 | 1/1991 | Kratel et al. ............... 252/62 |
| 5,015,606 | 5/1991 | Lang et al. ............... 252/62 X |
| 5,338,349 | 8/1994 | Farrar ............... 252/62 X |

FOREIGN PATENT DOCUMENTS

| | | |
|---|---|---|
| 0027633 | 9/1982 | European Pat. Off. . |
| 0488308 | 6/1918 | France . |
| 3713526 | 2/1988 | Germany . |

*Primary Examiner*—Melvin C. Mayes
*Attorney, Agent, or Firm*—Collard & Roe, P.C.

[57] ABSTRACT

A process for the production of a microporous body having heat insulation properties by (a) mixing of
  (I) 0.5%–60% by weight of at least one compound selected from the group consisting of magnesium carbonate/calcium carbonate, and magnesium carbonate/calcium hydroxide
  (II) 5%–95% by weight of highly dispersed $SiO_2$ with a content of 0%–20% by weight of $Al_2O_3$ (based on the $SiO_2$ employed);
  (III) 0%–60% by weight of an opacifying agent having at least one absorption maximum in the wavelength range of 1.5–10 μm; and
  (IV) 0.1%–10% by weight of an organic fiber selected from the group consisting of cellulose fibers and carbon fibers;

(b) compressing the mixture prepared to form a shaped article; and (c) heating the shaped article under oxidizing conditions produced at a temperature between 750° C. to 950° C. to oxidize the organic fibers and to produce the microporous body.

8 Claims, No Drawings

PROCESS FOR THE PRODUCTION OF A MICROPOROUS BODY HAVING HEAT INSULATION PROPERTIES

This is a continuation of application Ser. No. 08/235,548 filed on Apr. 29, 1994, now abandoned.

BACKGROUND OF THE INVENTION

1. Field of the Invention

The present invention relates to a process for the production of a microporous body having heat insulation properties which is based on highly dispersed oxides of the elements silicon and/or aluminum.

2. The Prior Art

EP-27633 B1 discloses a process for the production of a heat insulation body from a highly dispersed insulating material, opacifying agent, reinforcing fiber mixture and, if appropriate, a binder, these materials being mixed and the mixture being compacted. A disadvantage of this process is that, in addition to organic fibers, inorganic fibers, such as asbestos, the damaging effect of which on health has been proved, are also used. It is furthermore disclosed that all the inorganic or organic binders which soften or melt below 700° C. can be employed as the binder, the temperature limit of about 700° C. having to be observed because the particles of insulating material start to sinter above this limit and the heat insulation property of the insulation body is lost.

SUMMARY OF THE INVENTION

It is an object of the present invention to provide a process for the production of a microporous body having heat insulation properties which does not use inorganic fibers as a reinforcing material and is not subject to the limitations mentioned in the prior art with respect to exposure of the microporous body to heat.

The above object is achieved according to the invention by a process which comprises (a) mixing of
  (I) 0.5%–60% by weight of at least one compound selected from the group consisting of magnesium carbonate/calcium carbonate, and magnesium carbonate/calcium hydroxide
  (II) 5%–95% by weight of highly dispersed $SiO_2$ pyrogenically prepared with a content of 0%–20% by weight of $Al_2O_3$ (based on the $SiO_2$ employed);
  (III) 0%–60% by weight of an opacifying agent having at least one absorption maximum in the wavelength range of 1.5–10 μm;
  (IV) 0.1%–10% by weight of an organic fiber selected from the group consisting of cellulose fibers and carbon fibers;

(b) compressing the mixture prepared to form a shaped article; and (c) heating of the shaped article under oxidizing conditions produced at a temperature between 750° C. to 950° C. to oxidize the organic fibers and to produce the microporous body.

Surprisingly, it has been found that during the heat treatment of the shaped article according to step (c) of the process, the compounds (I) are mineralized, completely or partly, to alkaline earth metal silicates, without the microporous structure of the shaped article and its heat insulation properties thereby being impaired. By the new formation of silicates during the heat treatment, the microporous shaped article undergoes additional compaction, which has a favorable effect on its mechanical processability and resistance. Furthermore, the bodies having heat insulation properties produced according to the invention can still be used at ambient temperatures of up to 950° C.

An oxide, hydroxide or carbonate of a metal of main group 2 (alkaline earth metals) of the Periodic Table of Elements, preferably of calcium or magnesium, is used as component (I) of the mixture compressed to a shaped article in step (b) of the process. Any desired mixtures of the alkaline earth metal compounds mentioned can, of course, also be employed. The content of component (I) in the mixture compressed in step (b) of the process is 0.5%–60% by weight, preferably 5%–40% by weight and particularly preferably 15%–35% by weight. It is further advantageous for the par of component (I) to have a BET surface area of 1-30 $m^2/g$, preferably 8–20 $m^2/g$.

Component (II) of the mixture forms the basis of the microporous body to be produced. $SiO_2$ with a content of 0%–20% by weight of $Al_2O_3$ (based on the $SiO_2$ employed) is used. Pyrogenically produced $SiO_2$, the specific surface area of which, measured by the BET method, is 10–700 $m^2/g$, preferably 50–450 $m^2/g$, particularly preferably 150–400 $m^2/g$, is preferably employed. The content of component (II) in the mixture compressed in step (b) of the process is 5%–95% by weight, preferably 35%–80% by weight and particularly preferably 45%–65% by weight.

The opacifying agent admixed as component (III) in step (a) of the process should have at least one absorption maximum in the wavelength range of 1.5–10 μm. Suitable compounds are $TiO_2$, $FeTiO_3$, $ZrO_2$, $ZrSiO_4$ and $Fe_3O_4$ and mixtures thereof. Component (III) has a content of 0%–60% by weight, preferably 10%–50% by weight and particularly preferably 15%40% by weight, in the mixture compressed to a shaped art in step (b) of the process.

The content of organic fibers component (IV) in the mixture to be prepared according to step (a) of the process is 0.1%–10% by weight, preferably 1%–8% by weight and particularly preferably 2%–6% by weight. Graphite fibers, carbon fibers, cellulose, cotton and fibrous plastics are particularly suitable. Fibers having a diameter of greater than 3 μm are preferably employed.

In step (a) of the process according to the invention, the four components (I)–(IV) are mixed intensively in the preselected ratios of amounts and in the dry state.

According to step (b) of the process, the mixture prepared in step (a) is compressed, with shaping, to a shaped article. Compressing is preferably carried out under specific compressing pressures of 2–30 bar, preferably 8–15 bar. If appropriate, the resulting shaped article can readily be worked mechanically after compressing.

In step (c) of the process, the shaped article is burned at temperatures of above 700° C., preferably at 750° C.–950° C. and particularly preferably at 800° C.–950° C. The shaped article is expediently heated in tunnel or roller furnaces or in furnaces operated batchwise. The shaped article is furthermore heated under oxidizing conditions, preferably in an oxygen atmosphere or with a regulated oxygen intake. The content of organic fibers in the shaped article is oxidized in this manner, $CO_2$ and any water escaping, without the shaped article thereby being destroyed. The heat treatment furthermore leads to mineralization of the alkaline earth metal compound(s) (component I of the mixture prepared in step (a)) to form silicates. The shaped article is additionally compacted by this operation.

The shaped article, having heat insulation properties produced according to step (c) of the process, has a different composition from the mixture prepared in step (a) of the process; the content of mainly microporous alkaline earth metal silicates is 0.5%–50% by weight, preferably 3%–30% by weight and particularly preferably 5%–20% by weight. The content of $SiO_2$ is 5%–95% by weight, preferably 25%–75% by weight and particularly preferably 35%–65% by weight. This content is reduced accordingly by the amount of $Al_2O_3$ which was originally admixed in step (a) of the process. The content of opacifying agent is 0%–60% by weight, preferably 10%–15% by weight and particularly preferably 15%–40% by weight. The burned, microporous shaped article is free from organic fibers and has a porosity of typically 70%–95%. Its thermal conductivity varies between $\lambda=0.02$–$0.1$ W/mK (measured at 300° C.–500° C. in accordance with ISO/TC 33). The body produced by the process according to the invention furthermore has a density of 0.1–1.0 g/cm³ and an average pore diameter of 0.01–10 µm and can also be used as a heat insulator, even at an ambient temperature as high as 950° C.

The shaped article obtainable according to step (c) of the process can be subjected to various fabrication measures, for example, subsequent mechanical working by milling, drilling, sawing or grinding, or rendered hydrophobic, covered with inorganic layers, such as gypsum or fireproof ceramic compositions, or sealed in a gas-tight, evacuated casing. The edges and surfaces can be laminated with plastic film or metal foil, paper or glass fabric. If an adhesive is used, it is possible for the adhesive to penetrate 0–2 mm, preferably 0–1 mm, into the surface of the body.

On the basis of the properties mentioned, the microporous shaped article can be used as a heat insulating material in the temperature range from –273° C. to 950° C., for example, in electrical equipment, such as electrical storage equipment, ceramic cooking surfaces or toasters, and in industrial furnaces, measuring equipment, refrigeration units and refrigeration cells.

DETAILED DESCRIPTION OF THE PREFERRED EMBODIMENTS

Other objects and features of the present invention will become apparent from the following detailed description considered in connection with the accompanying Examples, which disclose the embodiments of the present invention. It should be understood, however, that the Examples are designed for the purpose of illustration only and not as a definition of the limits of the invention.

EXAMPLE 1

52% by weight of highly dispersed silicic acid, 25% by weight of $CaCO_3$ and $MgCO_3$ in a weight ratio of 1:1, 21% by weight of $TiO_2$ and 2% by weight of cellulose fibers were mixed in the dry state and the mixture was compressed axially into sheets having a density of 0.34 g/cm³. The sheets were heated continuously in a roller furnace at temperatures of up to 900° C. The hardened sheets thus obtained were ground to size, sawn and laminated on all sides by gluing on aluminum foil 30 µm thick. The components had a density of 0.31 g/cm³ and a thermal conductivity of 0.025 W/mK at a temperature of 200° C.

EXAMPLE 2

50% by weight of highly dispersed silicic acid, 15% by weight of $MgCO_3$, 10% by weight of $Ca(OH)_2$, 23% by weight of $FeTiO_3$ and 2% by weight of carbon fibers were mixed intensively in the dry state and, taking into account shrinkage during production of 0.3%, the mixture was compressed into moldings of defined contour. The compressed moldings were heated up to 850° C. in a chamber furnace for 3 hours and heat-treated at this final temperature for 10 minutes. Cooling was effected by controlled blowing-in of air.

EXAMPLE 3

60% by weight of highly dispersed silicic acid, 20% by weight of $ZrSi_4$, 5% by weight of MgO, 13% by weight of $CaCO_3$ and $MgCO_3$ in a weight ratio of 1:1 and 2% by weight of cellulose fibers were mixed in the dry state and the mixture was compressed into hemispheres via a quasi-isostatic pressing operation. Heating was carried out in a flow-through furnace at temperatures of up to 950° C. These components were cut to a required length by means of a band saw and laminated on one side with paper which is difficult to ignite.

While several embodiments of the present invention have been shown and described, it is to be understood that many changes and modifications may be made thereunto without departing from the spirit and scope of the invention as defined in the appended claims.

What is claimed is:

1. A process for the production of a microporous body having heat insulation properties which is based on highly dispersed oxides of the elements silicon and/or aluminum, which process comprises
   (a) mixing to prepare a mixture of
      (I) 0.5%–60% by weight of a mixture selected from the group consisting of magnesium carbonate/calcium carbonate, and magnesium carbonate/calcium hydroxide;
      (II) 5%–95% by weight of pyrogenically prepared $SiO_2$ with a content of 0%–20% by weight of $Al_2O_3$ (based on the $SiO_2$ employed);
      (III) 0%–60% by weight of an opacifying agent having at least one absorption maximum in the wavelength range of 1.5–10 µm; and
      (IV) 0.1%–10% by weight of an organic fiber, selected from the group consisting of cellulose fibers and carbon fibers;
   (b) compressing the mixture prepared to form a shaped article; and
   (c) heating the shaped article under oxidizing conditions produced at a temperature between 750° C. to 950° C. to oxidize the organic fibers and to produce the microporous body.

2. The process as claimed in claim 1, wherein the shaped article is heated to between 800° C. to 950° C.

3. The process as claimed in claim 1, wherein, after heating, mechanically working the microporous body.

4. The process as claimed in claim 1, wherein, after heating, rendering the microporous body.

5. The process as claimed in claim 1, wherein, after heating, covering the microporous body with an inorganic layer.

6. The process as claimed in claim 5, wherein the inorganic layer is selected from the group consisting of gypsum and a fireproof ceramic composition.

7. The process as claimed in claim 1, wherein, after heating, laminating the microporous body with a laminate selected from the group consisting of plastic film, metal foil, paper and glass fabric.

8. The process as claimed in claim 1, wherein, after heating, sealing the microporous body in a gas-tight, evacuated casing.

* * * * *